United States Patent [19]
Stucchi

[11] Patent Number: 6,026,857
[45] Date of Patent: Feb. 22, 2000

[54] QUICK COUPLING PIPE FITTING WITH SAFETY VALVE AND PRESSURE RELIEVE VALVE

[75] Inventor: Giovanni Stucchi, Treviglio, Italy

[73] Assignee: Stucchi s.r.l., Italy

[21] Appl. No.: 09/284,727

[22] PCT Filed: Oct. 17, 1997

[86] PCT No.: PCT/EP97/05913

§ 371 Date: Apr. 19, 1999

§ 102(e) Date: Apr. 19, 1999

[87] PCT Pub. No.: WO98/19097

PCT Pub. Date: May 7, 1998

[30] Foreign Application Priority Data

Oct. 25, 1996 [IT] Italy .................................. MI96A2211

[51] Int. Cl.[7] .................................................. F16L 37/28
[52] U.S. Cl. ...................................... 137/614.03; 137/614
[58] Field of Search ........................ 137/614.04, 614.03, 137/614

[56] References Cited

U.S. PATENT DOCUMENTS 5,159,955  11/1992  Ekman .
5,215,122   6/1993  Rogers et al. .
5,592,970   1/1997  Stucchi et al. ..................... 137/614.03
5,918,633   7/1999  Zeiber ............................ 137/614.04 X

FOREIGN PATENT DOCUMENTS 0 686 800  12/1995  European Pat. Off. .
41 01 001   7/1991  Germany .
2 147 074   5/1985  United Kingdom .
2 278 420  11/1994  United Kingdom .

*Primary Examiner*—Kevin Lee
*Attorney, Agent, or Firm*—Quarles & Brady LLP

[57] ABSTRACT

A valve fitting comprises a female element and a male element. The elements are composed of fixed parts and axially sliding parts that, when at rest, arrange themselves in a closing position of a passage opening for fluid and in occurrence of the coupling between the two elements are displaced by their engagement with corresponding parts of the other element to an opening position of the passage opening. The male element includes a safety valve to intercept a fluid feed substantially at the end of the coupling manoeuvre of the two fitting elements. The male coupling member includes also a pressure relief valve interposed between the fluid feed and a pressure relief chamber.

2 Claims, 3 Drawing Sheets

QUICK COUPLING PIPE FITTING WITH SAFETY VALVE AND PRESSURE RELIEVE VALVE

BACKGROUND OF THE INVENTION

The present invention refers to a quick coupling pipe fitting that is provided with a safety valve and a pressure relieve valve. In the transmission of fluids it is often necessary to avail of fitting that can be coupled rapidly to connect flexible or rigid pipes, connected themselves to a fluid feed and to users.

The known quick coupling fittings are generally composed of two elements, male and female, attached to corresponding pipes to be connected and coupled to each other by screw or trip means.

According to a currently known technique the female element is made of a structure comprising an interior body with one end inserted in an internally threaded nut for coupling with a feed or users and an exterior body coaxial to said interior body.

The interior body holds a valve element consisting of a fixed axial internal shaft with an enlarged end. Outside of this, concentrically, is coupled, in a way as to leave an interspace connectable afterwards to a feed or to users, a tightness bush that, under the elastic action of a positioning spring and through the engagement of the enlarged end of the shaft, closes tightly frontally said interspace with respect to the passage of fluid in absence of coupling with the male element.

Concentrically and externally to the bush, there is a cleaning unit of said bush composed of a sliding sleeve with its respective positioning spring.

An annular element with spokes is attached to the interior body, between the same and a back portion of the axial shaft, in which annular element a few small diameter holes are created for the passage of fluid. As an alternative, in order to avoid the turbulence associated with the presence of the small diameter holes, such annular element can be provided with at least two passage openings of annular sector shape following one another, spaced by narrow spokes, along the circumference of said annular element.

The male element generally comprises an exterior body provided with means for coupling with the female element on one end, an interior body coaxialiy fixed to said exterior body and an internally threaded nut fixed to the opposite end of said interior body for coupling of the male element to a feed or to users. Within said interior body an axial cavity is defined that is connectable afterwards to a feed or to users and that is closed frontally with a piston stressed by a positioning spring to a position of peripheral engagement with a seal held by the fore end of the interior body.

During coupling between the male element and the female element, the sliding sleeve of the female element is pushed by the interior body of the male element and, during its translation, draws with itself the bush against the strain force of its positioning spring. At the same time the inner axial shaft of the female element forces the piston of the male element to back against the force of the respective positioning spring up to a position of opening the inner cavity of the male element with the consequent definition of a passage opening for the fluid from a feed to users through the fitting. The bush of the female element is positioned at that moment within the seal of the male element in order to guarantee the side tightness of said opening.

If a fitting of this type is used at very high operating fluid pressures it may occur that at the moment of coupling the male element is under pressure and the female element is exhaust. Within the fitting there can be developed such high pressure difference as to compromise the stay of the internal seals in their seating. This occurs, in particular, with said seal of the male element; indeed, since the seating of the seal is usually rather spaced away from the fore end of the male element, it can occur that the seal remains uncovered and exposed to the fluid flow under pressure during the axial translation effected by the piston of the male element to engage with the bush of the female element, especially if the difference in pressure causes a displacement of the bush in an opposite direction. Due to the strong difference in pressure, the seal is subject to such stress as to be moved from its sealing. The consequent lack of tightness causes blow-by and fluid leakage from the fitting.

In order to avoid this inconvenience, in a known fitting described in EP-A-0686800 the male element includes also a safety valve located upstreanm of said male element cavity in the direction of fluid feed to said male element in order to close the communication between said feed and said cavity in the initial phases of coupling of the two elements of the fitting and to open instead said communication substantially at the end of said coupling.

In addition the male element seal is housed in a seating located very close to the fore end of the male element, so that said seal is covered by said bush of the female element in any axial position taken by said bush during said initial and final phases of said coupling.

The presence of a safety valve and the described positioning of the seal avoid that the seal gets exposed to dangerous stress deriving from possible high differences under pressure between the two elements, because the passage of fluid through the fitting is allow ed only when the seal is certainly covered and protected by the bush even if the bush temporarily backs for the effect of the high pressure difference. Therefore, the seal remains in its seating and carries out correctly its leak tightness function even in particular coupling conditions, when the male element is under pressure and the female element is exhaust, without any occurrence of blow-by and fluid leakage from the fitting.

In addition such a fitting, operating at high pressure does not consent a manual coupling manoeuvre, since the effort to overcome in order to obtain the coupling between the two elements of the fitting is actually above normal human capacity.

In view of this, object of the present invention is to implement a pipe fitting with a safety valve, which allows the manual coupling of the two elements of the fitting even in case of high operating pressure.

According to the invention such aim has been achieved with a fitting comprising a female element and a male element couplable to each other, which elements are made of fixed parts and axially sliding parts that, when at rest, are arranged in a closing position of a passage for opening for fluid and in the occurrence of the coupling between the two elements are displaced by their engagement with corresponding parts of the other element to a position of opening of said passage opening, said fixed parts of the female element comprising a valve element consisting of a fixed axial internal shaft with an enlarged end and said sliding parts of the female element comprising an axially sliding bush arranged coaxially outside of said shaft in a way as to define an interspace constituting part of said passage opening for the fluid and stressed elastically to engage with said enlarged end of the shaft in order to close tight said interspace with respect to the passage of fluid in absence of coupling with the male element, said fixed parts of the male element comprising a fixed body provided with a seal coverable with said bush of the female element in the occurrence of said coupling and said sliding parts of the male element comprising a sliding piston stressed elastically to a position of lateral engagement with said seal in order to close tight an axial cavity of the male element that constitutes an additional part of said passage opening for fluid and to open it after its frontal engagement with said enlarged end of the shaft of the female element in the occurrence of the coupling of the two elements of the fitting, and a safety valve located between said axial cavity of the male element and an end of the male element connectable to a fluid feed in order to lock the communication between said feed and said axial cavity and actuated by said piston in a way as to open said communication after the opening of said interspace of the female element and of said cavity of the male element and substantially at the end of said coupling, characterised in that said male element comprises also a pressure relieve valve interposed between said fluid feed and a pressure relieve chamber and provided with an opening pin arranged in a way as to be actuated directed by said piston just before the opening movement of the safety valve.

In this way, before the opening of the safety valve, there occurs a pressure relieve that allows to carry out the manual coupling of the two elements of the fitting even in presence of a high operating pressure and without any leak of fluid.

BRIEF DESCRIPTION OF THE DRAWINGS

The characteristics of the present invention will be made more evident by the following detailed description of an embodiment, illustrated as a non-restrictive example in the attached drawings, where.

DETAILED DESCRIPTION OF THE PREFERRED EMBODIMENT

Figure 1:
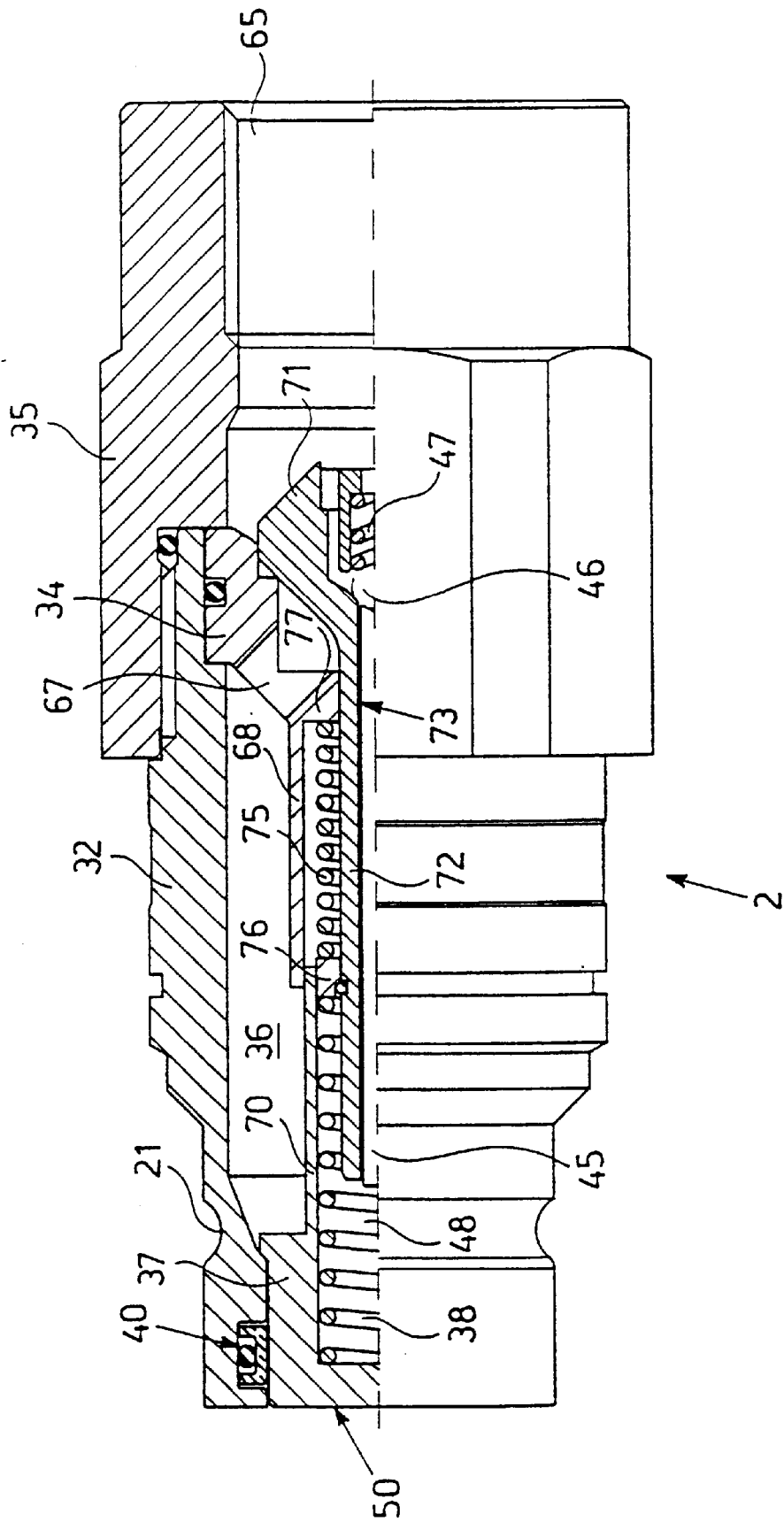
FIG. 1 is a longitudinal section of a male element of the fitting according to the invention.

The fitting illustrated in the drawings is formed by a female element 1 and a male element 2.

Figure 2:
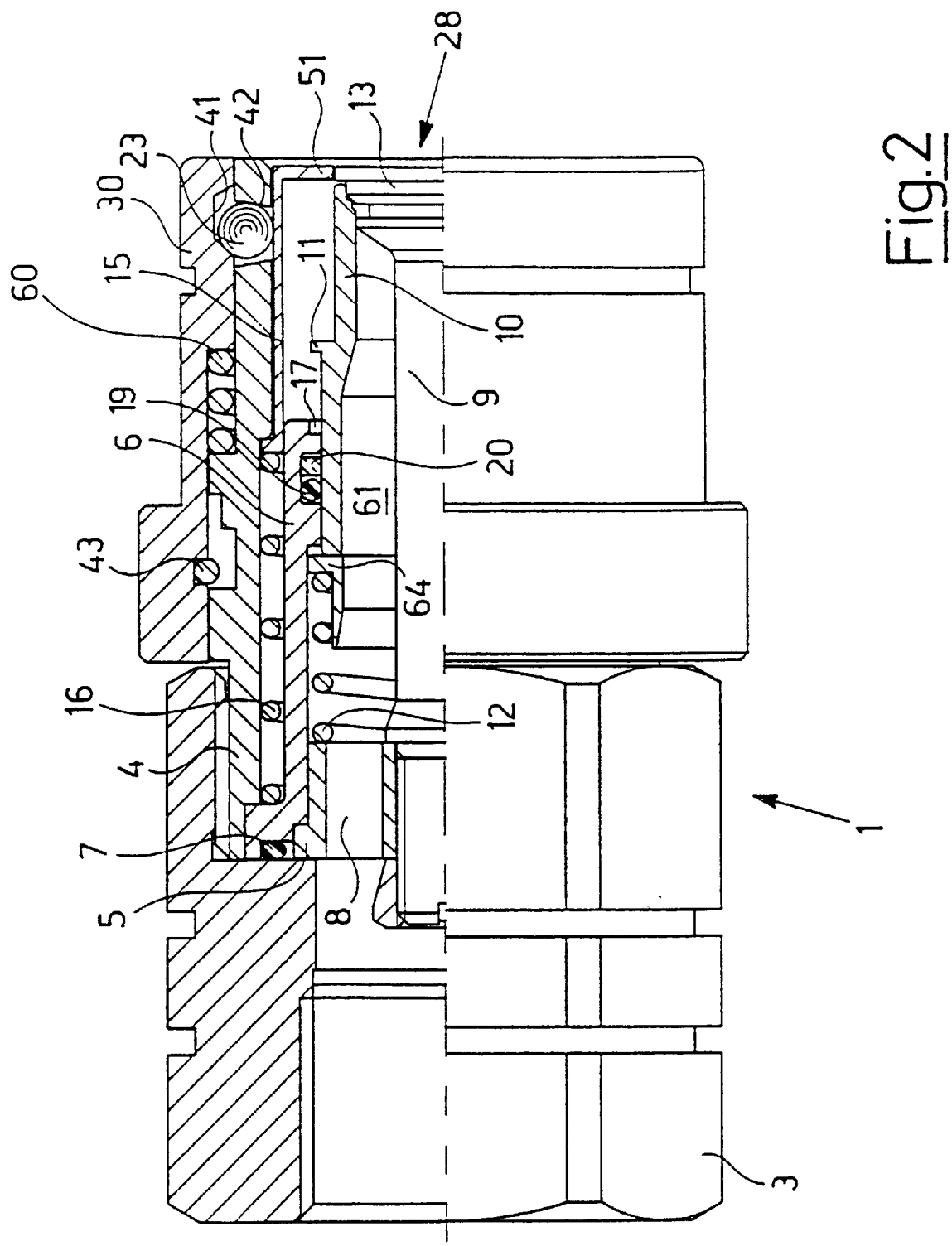
FIG. 2 is a longitudinal section of the corresponding female element.

The female element 1 is shown in FIG. 2 and comprises, rigidly fixed to each other, a nut 3 provided with an internal thread for the connection to a fluid feed or to users, an exterior body 4 made up with said nut 3 on one end, a fixed annular bottom plate 5 crossed by various openings 8 for the passage of fluid and an interior body 6, arranged concentrically with respect to the exterior body 4. The perfect fluid tightness between said exterior body 4 and said nut 3 is guaranteed by a seal 7.

The annular bottom plate 5 holds a fixed inner axial shaft 9. Externally and concentrically to said shaft 9, in a way as to leave an interspace 61, is placed a tightness bush 10 sliding axially, supplied with protruding elements 11; at a condition of rest, with the fitting open, said tightness bush 10 is stressed, along an axial direction, by a spring 12 that pushes said bush 10 toward right, by means of a sleeve 64; the engagement with an enlarged end 13 of the shaft 9 balances the force exerted by said spring 12 and maintains the bush 10 in a balance condition.

The engagement of the bush 10 with the enlarged end of the shaft 9 prevents the passage of fluid in conditions of rest.

Concentrically and externally to the tightness bush 10 and inside the exterior body 4, is placed a cleaning unit of the bush itself, formed by a sleeve 15, supplied with a terminal transverse element 51, sliding axially on the external surface of said side of the interior body 6 and stresses by a positioning spring 16.

The interior body 6, in which seatings 17 are created for the protruding elements 11 of the tightness bush 10, shows a contact surface, the latter, that is supplied with an additional seal 19 and with an anti-extrusion device 20.

The exterior body 4 provides, on the end devoted to the coupling with the male element 2, for a sliding sleeve 30 supplied with a positioning spring 60. Near its back end the sleeve 30 is internally equipped with an elastic ring 43.

On the fore part of the inside surface the sleeve 30 provides for an annular notch 41 aimed at defining, at a position of rest represented in FIG. 1 and in conjunction with a corresponding sequence of holes 42 of the interior body 4, respective seatings for balls 23 serving the purpose to lock the male 2 and female 1 elements.

The end surfaces of the exterior body 30, of the sleeve 15, of the interior body 4 and of the shaft 9 are arranged in a way as to form an entire flat surface totally indicated as 28.

The fitting male element 2 is shown in its turn in FIG. 1 and comprises a fixed exterior body 32 on which afterwards an end nut 35 with an internal duct 65 is made up for coupling to a feed or to users. Inside the body 32, fixed by means of a nut 35, is placed an element 34, pierced with various holes 67. The inner element 34 is supplied with a tubular fore extension 68, that together with the exterior body 32 defines an internal axial cavity 36 that is closed frontally by a piston 37 stresses by a spring 38. The tightness between the external body 32 and the piston 37 is guaranteed by a seal 40, composed of an elastic ring and an O-ring, that is housed in an annular seating of the body 32. Said seating is located near a frontal end of the interior body 32 that faces the bush 10. By engagement with the seal 40 the piston 37 closes tightly frontally the axial cavity 36. The piston 37 is supplied with a back tang 70 that is engaged in an axially sliding way with the tubular extension 68 of the interior body 34.

In the male element 2 is also provided a safety valve 73 with mushroom shaped head 71, that is provided with a shaft 72 on which is securely attached an annular buttress 76 on which the back tang 70 of the piston slides. The head 71 of the safety valve 73 is normally maintained against the interior body 34 by a spring 75, in a way as to intercept the communication between the duct 65 and the cavity 36. The spring 75 is interposed between the annular buttress 76 and a radial wall 77 of the interior body 34. With the annular buttress 76 of the shaft 72 is also engaged the spring 38 exerting on the piston.

Inside the shaft 72 is slidingly inserted an axial pin 45, protruding frontally to a limited extent from the shaft 72 and resting backwards on a ball 46, that is stressed by a spring 47 to a closing position of the communication between said duct 65 and a chamber 48 defined within the piston 37.

In a position behind the seal 40 the exterior body 32 shows an annular seating 21 aimed at housing the balls 23 of the female element 1 when the two elements 1 and 2 are in coupled position.

The end surfaces of the exterior body 32 and of the piston 37 are arranged in a way as to form a flat surface totally referred as 50.

Starting with the rest position of the two female and male elements 1 and 2 of the fitting according to the invention, illustrated in FIGS. 1 and 2, the coupling is carried out bringing the elements 1 and 2 close in a way as to put the respective surfaces 28 and 50 in contact. In particular the face surface of the piston 37 and the face surface of the vertical element 51 of the sleeve 15 is put in contact with the face surface of the exterior body 32 of the male element 2.

The first coupling step provides for the backing of the sleeve 15 of the female element 1 under the drive of the exterior body 32 of the male element 2 and that of the piston 37 of the male element 2 under the drive of the shaft 9 of the female element 1 with the consequent opening of the communication between the interspace 61 of the female element and the axial cavity 36 of the male element.

The backing of the piston 37 then causes the backing of the pin 45, that moves the ball 46 backwards, opening the communication between the duct 65 and the chamber 48. If the duct 65 is connected to a high pressure fluid feed, this determines a pressure relieve upstream of the safety valve 73 and allows for the continuation of the manual coupling of the two elements of the fitting, otherwise prevented by the high axial strength to be applied.

With such pressure relieve, instead, the further axial approach of the two elements 1 and 2 allows the piston 37 to cause for the backing of the safety valve 73 and together with it the opening of the communication between the feed duct 65 and the cavity 36, that is itself already communicating with the interspace 61 of the female element 1 and therefore with users connected to the female element itself.

The coupling is completed and stabilised with the sliding of the sleeve 30 of the female element, that is made possible by the radial displacement of the balls 23 at first in a position such as to allow said sliding and afterwards inside the annular seating 21 of the male element.

Figure 3:
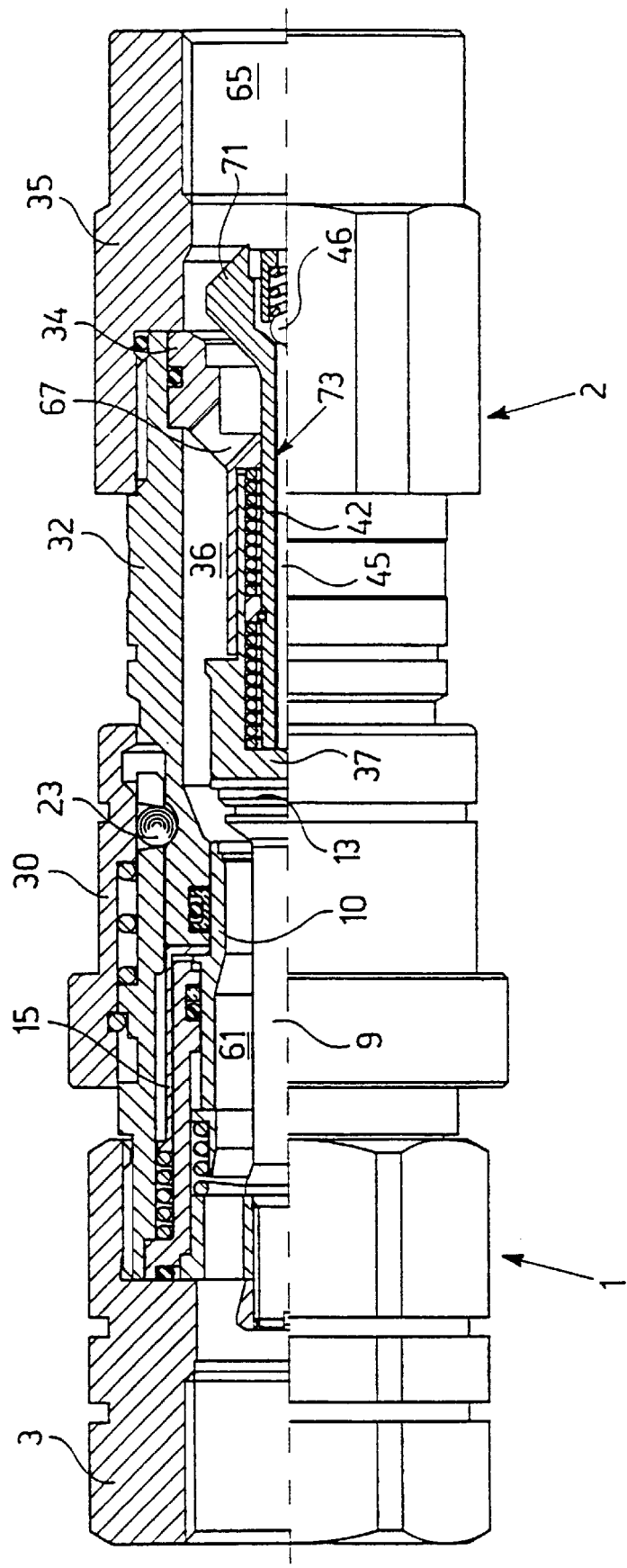
FIG. 3 is a longitudinal section of the two elements of the fitting coupled with each other.

The final situation once the coupling is completed and locked is illustrated in FIG. 3.

It must be noted that the actuation of the pin 45 for the opening of the ball valve 46 is determined by the piston 37, that when at rest is moved away from the pin 45 and only just before the end of its backing course meets the pin 15. This means that the opening of the ball valve 46 is independent from the pressure values within the feed duct 65.

I claim:

1. Quick coupling pipe fitting, comprising a female element (1) and a male element (2) couplable to each other, which elements (1, 2) are made of fixed parts (4, 9; 32) and axially sliding parts (10, 15; 37) that, when at rest, arrange themselves in closing position of an passage opening (61, 36, 65) for fluid and in the occurrence of the coupling between the two elements (1, 2) are displaced by their engagement with corresponding pans of the other element to a position of opening of said passage opening (61, 36, 65), said fixed parts (4, 9) of the female element (1) comprising a valve element consisting of a fixed axial internal shaft (9) with an enlarged end (13) and said sliding parts (10, 15) of the female element (1) comprising an axially sliding bush (10) arranged coaxially outside of said shaft (9) in a way as to define an interspace (61) constituting part of said passage opening (61, 36, 65) for the fluid and stressed elastically to engage with said enlarged end (13) of the shaft (9) in order to close right said interspace (61) with respect to the passage of fluid in absence of coupling with the male element (2), said fixed parts (32) of the male element (2) comprising a fixed body (32) provided with a seal (40) coverable with said bush (10) of the female element (1) in the occurrence of said coupling and said sliding parts (37) of the male element (2) comprising a sliding piston (37) elastically stressed to a position of lateral engagement with said seal (40) in order to close tight an axial cavity (36) of the male element (2) that constitutes an additional part of said passage opening (61, 36, 65) for fluid and to open it after its frontal engagement with said enlarged end (13) of the shaft (9) of the female element (1) in the occurrence of the coupling of the two elements (1, 2) of the fitting, and a safety valve (73) positioned between said axial cavity (36) of the male element (2) and an end (65) of the male element (2) connectable to a fluid feed in order to close the communication between said feed (65) and said axial cavity (36) and actuated by said piston (37) in a way as to open said communication after the opening of said interspace (61) of the female element (1) and of said axial cavity (36) of the male element (2) and substantially at the end of said coupling, characterised in that said male element (2) comprises also a pressure relieve valve (46) interposed between said fluid feed (65) and a pressure relieve chamber (48) and provided, with an opening pin (45) arranged in a way as to be actuated directly by said piston (37) just before the opening movement of the safety valve (73).

2. Fitting according to claim 1, characterised in that said pressure relieve valve (46) is a ball valve and said opening pin (45) is an axial pin normally moved away from said piston (37) and actuated frontally by the same after the displacement of said piston (37) for opening said cavity (36) of the male element (2).

* * * * *